United States Patent [19]

Reimann

[11] 4,445,340

[45] May 1, 1984

[54] DILUTION CYCLE CONTROL FOR AN ABSORPTION REFRIGERATION SYSTEM

[75] Inventor: Robert C. Reimann, Lafayette, N.Y.

[73] Assignee: The United States of America as represented by the United States Department of Energy, Washington, D.C.

[21] Appl. No.: 456,131

[22] Filed: Jan. 6, 1983

[51] Int. Cl.³ ............................................. F25B 15/00
[52] U.S. Cl. ........................................ 62/101; 62/141; 62/476
[58] Field of Search .................. 62/101, 141, 476, 146

[56] References Cited

U.S. PATENT DOCUMENTS

| | | | |
|---|---|---|---|
| 2,583,722 | 12/1952 | Berestneff | 62/119 |
| 2,679,733 | 6/1954 | Ashley | 62/119 |
| 2,760,350 | 8/1956 | Bourne | 62/119 |
| 3,296,813 | 12/1967 | Eisberg et al. | 62/101 |
| 3,374,644 | 3/1968 | Foster | 62/141 |
| 3,452,552 | 7/1969 | Johnson | 62/141 |
| 3,604,216 | 9/1969 | Porter | 62/141 |
| 3,626,710 | 9/1971 | Porter | 62/141 |
| 3,626,711 | 12/1971 | Porter et al. | 62/141 |
| 3,651,655 | 3/1972 | Dyre | 62/141 X |
| 3,831,390 | 8/1974 | Hopkins | 62/101 |
| 4,348,868 | 9/1982 | Foster et al. | 62/141 X |

Primary Examiner—Lloyd L. King
Attorney, Agent, or Firm—David L. Adour

[57] ABSTRACT

A dilution cycle control system for an absorption refrigeration system is disclosed. The control system includes a time delay relay for sensing shutdown of the absorption refrigeration system and for generating a control signal only after expiration of a preselected time period measured from the sensed shutdown of the absorption refrigeration system, during which the absorption refrigeration system is not restarted. A dilution cycle for the absorption refrigeration system is initiated in response to generation of a control signal by the time delay relay. This control system is particularly suitable for use with an absorption refrigeration system which is frequently cycled on and off since the time delay provided by the control system prevents needless dilution of the absorption refrigeration system when the system is turned off for only a short period of time and then is turned back on.

9 Claims, 2 Drawing Figures

DILUTION CYCLE CONTROL FOR AN ABSORPTION REFRIGERATION SYSTEM

STATEMENT AS TO RIGHTS TO INVENTIONS MADE UNDER FEDERALLY-SPONSORED RESEARCH AND DEVELOPMENT

The U.S. government has rights in this invention pursuant to contract No. DE-AC03-77CS31587 awarded by the U.S. Department of Energy.

BACKGROUND OF THE INVENTION

The present invention relates to absorption refrigeration systems. More particularly, the present invention relates to control systems for operating absorption refrigeration systems to prevent crystallization of absorbent solution in the refrigeration systems during periods of shutdown of the systems.

Absorption refrigeration systems, especially those employing a saline solution as an absorbent and water as a refrigerant, frequently utilize a dilution cycle to prevent crystallization of the absorbent solution in the refrigeration system during shutdown of the system. The dilution cycle usually comprises supplying refrigerant, sometimes from the refrigerant evaporator of the refrigeration system, to dilute strong absorbent solution in the generator and/or heat exchanger of the absorption refrigeration system, immediately upon shutdown of the system. A subsequent start up of the refrigeration system requires that the refrigerant supplied for dilution to the generator and/or heat exchanger be boiled off to resume regular operation of the refrigeration system. If the absorption refrigeration system is frequently cycled on and off the heat energy required to boil off the dilution refrigerant at each start up of the refrigeration system may result in a significant heat input penalty which reduces the efficiency of the refrigeration system.

SUMMARY OF THE INVENTION

Therefore, an object of the present invention is to prevent crystallization of absorbent solution in an absorption refrigeration system during shutdown of the system while maintaining the operating efficiency of the system when the system is frequently cycled on and off This and other objects of the present invention are obtained by an absorption refrigeration system having a dilution cycle control for operating the system to provide a dilution cycle only after expiration of a preselected time period after shutdown of the system during which the system is not restarted. This dilution cycle control comprises a time delay relay, contact means, and a liquid level switch. The time delay relay senses shutdown of the absorption refrigeration system and generates a control signal only after expiration of a preselected time period measured from the sensed shutdown of the absorption refrigeration system during which the absorption refrigeration is not restarted. The contact means activates a refrigerant pump, a solution pump, and a dilution cycle control valve to provide a dilution cycle for the absorption refrigeration system in response to generation of the control signal by the time delay relay. The liquid level switch is located in the sump of the evaporator for the absorption refrigeration system, to sense the level of refrigerant in the evaporator. When a preselected low level of refrigerant is sensed in the evaporator by the switch, the switch operates to deactivate the contact means, thus deactivating the refrigerant pump, the solution pump, and the dilution cycle control valve, to end the dilution cycle.

BRIEF DESCRIPTION OF THE DRAWINGS

Other objects and advantages of the present invention will be apparent from the following detailed description in conjunction with the accompanying drawings, wherein like reference numerals identify like elements, and in which.

DESCRIPTION OF THE PREFERRED EMABODIMENT

Figure 1:
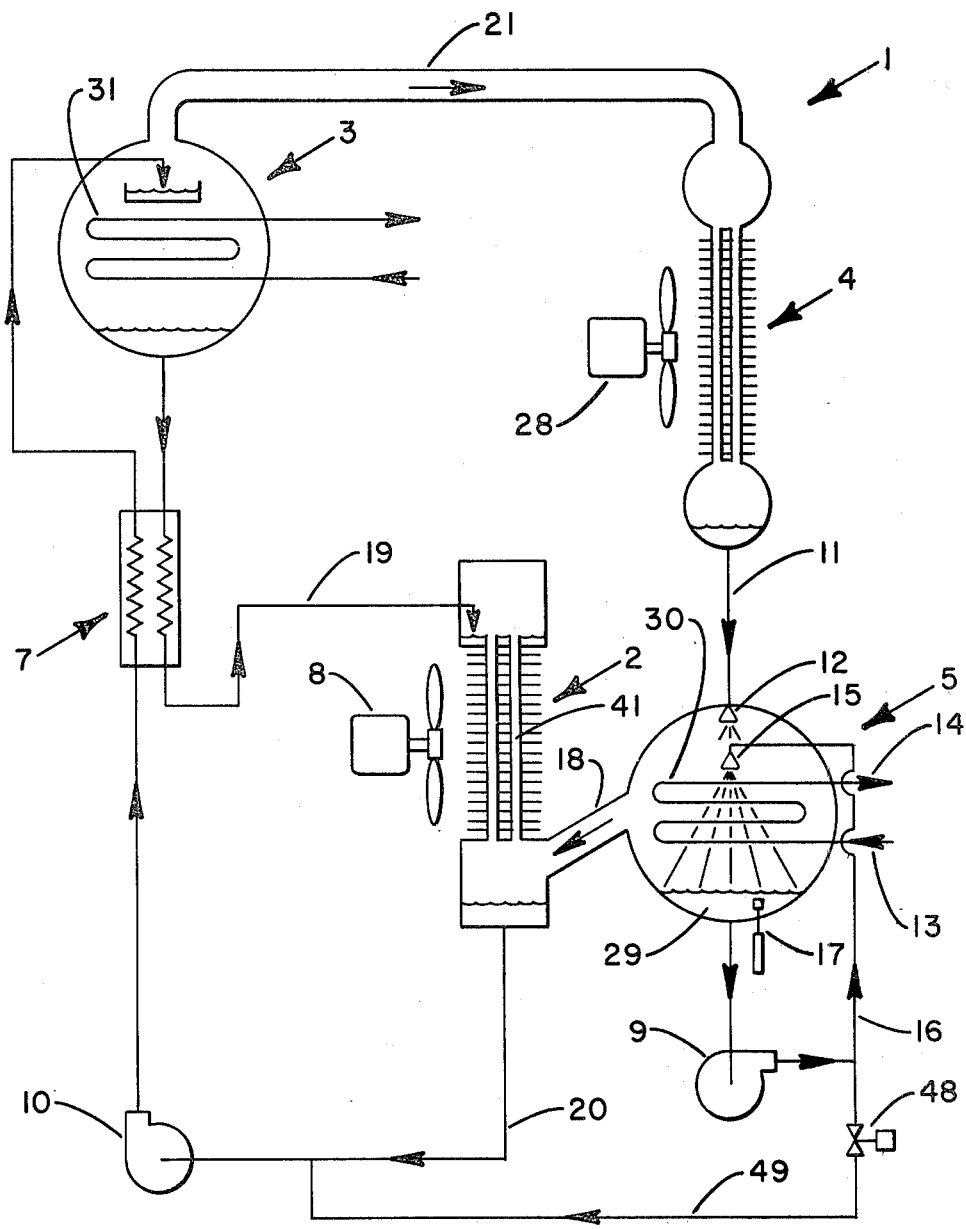
FIG. 1 is a schematic illustration of an air cooled absorption refrigeration system which may be operated to provide a dilution cycle according to the present invention.

Referring to FIG. 1, there is illustrated an air cooled absorption refrigeration system 1 of a type which employs water as a refrigerant and lithium bromide as an absorbent solution. While pure lithium bromide is not technically a solution, it is customary to refer to the absorbent as being a solution because it may have refrigerant dissolved therein and the term "solution" is therefore used throughout this application to denote the absorbent.

The term "strong" solution is used herein to refer to an absorbent solution which has a high absorbent concentration, such as pure lithium bromide. The term "weak" solution is used to denote an absorbent solution which has a low absorbent concentration because it has a substantial quantity of refrigerant dissolved therein.

It will be appreciated that refrigerants, other than water, and absorbents, other than lithium bromide, may be employed within the scope of this invention, and that various modifications may be made to the refrigeration system 1 to accommodate different absorbents and refrigerants.

The air cooled absorption refrigeration system 1 illustrated in FIG. 1, includes an absorber 2, a generator 3, a condenser 4, an evaporator 5, and a solution heat exchanger 7. Also, there is a refrigerant pump 9 and a solution pump 10.

Liquid refrigerant condensed in the condenser 4 passes through a refrigerant liquid passage 11 to a refrigerant spray nozzle 12, or to a plurality of such nozzles, in the evaporator 5. Also, liquid refrigerant which collects in sump 2 of the evaporator 5 is pumped by refrigerant pump 9 through a passageway 16 to a second refrigerant spray nozzle 15, or to a plurality of such nozzles, in the evaporator 5. In this manner, a flow of liquid refrigerant is continually in contact with heat exchange tubing 30 in the evaporator 5.

A fluid medium, such as water, to be chilled passes into the heat exchange tubing 30 in the evaporator 5 through an inlet line 13, where it is chilled by giving up heat to evaporate refrigerant within the evaporator 5. The chilled medium may then pass out of the heat exchange tubing 30 through an outlet line 14 to suitable remote heat exchangers (not shown), after which it is returned to the evaporator 5 through the inlet line 13 for rechilling. The refrigerant vapor from the evaporator 5 passes through refrigerant vapor passage 18 to the bottom of the absorber 2.

A strong solution inlet passage 19 admits strong absorbent solution from the generator 3 into the top of the absorber 2. The strong solution flows down through tubes 41 in the absorber 2 and is brought into contact with refrigerant vapor from the evaporator 5 which is flowing up the tubes 41. A weak solution discharge passage 20 provides an inlet to solution pump 10 which pumps the weak solution from the absorber 2 through the solution heat exchanger 7 back to the generator 3.

A cooling medium, such as ambient air, is passed over the absorber 2 by operation of a fan unit 8, or other suitable means, to cool the absorbent solution therein to promote the absorption of refrigerant vapor therein. If desired, the same cooling air may also pass over condenser 4 to condense refrigerant therin. However, as shown in FIG. 1, a separate condenser fan unit 28, or other suitable means, is used to cool the condenser 4.

Generator 3 includes a suitable source of heat, such as hot water supplied through tubing 31 in the generator 3, for boiling refrigerant out of the weak solution supplied to the generator 3 from the absorber 2. The refrigerant vapor formed in the generator 3 passes through a discharge passageway 21 into the condenser 4 where it is cooled and condensed by heat exchange with ambient air passing over the condenser 4. The relatively hot, strong absorbent solution collected at the bottom of the generator 3 passes through the solution heat exchanger 7 and through the strong solution inlet passage 19 to the absorber 2 to begin the absorption cycle again.

Also, as shown in FIG. 1, there is a dilution cycle control valve 48 in a dilution line 49 connecting the outlet of the refrigerant pump 9 to the inlet of the solution pump 10. A dilution cycle is carried out by opening control valve 48 and pumping liquid refrigerant from the sump 29 of the evaporator 5, by operation of the solution pump 10 and refrigerant pump 9, to dilute strong solution in the solution heat exchanger 7 and the generator 3. This dilution cycle is completed when a refrigerant low level switch 17, such as a float switch in the sump 29 of the evaporator 5, or other such sensor in the evaporator 5, senses a preselected low amount of refrigerant in the evaporator 5 and operates to close the valve 48 and turn off the pumps 9 and 10.

Figure 2:
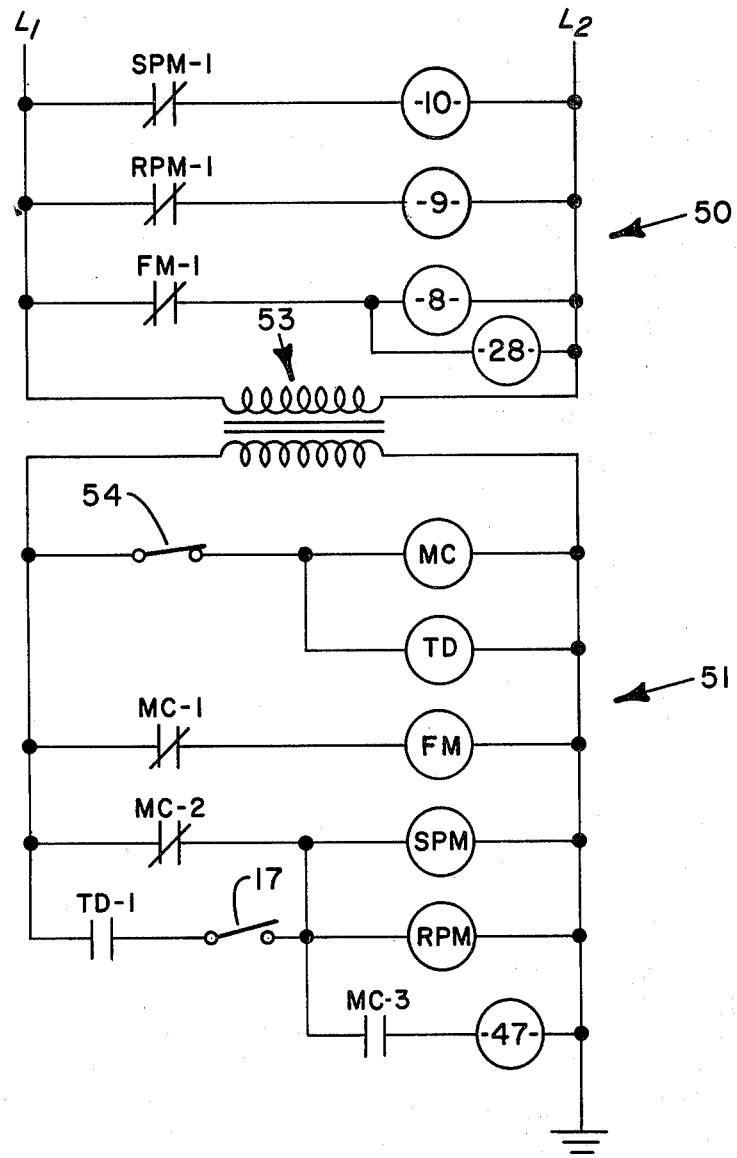
FIG. 2 is a circuit diagram showing a dilution cycle control system, according to the present invention, which is used to operate the absorption refrigeration system shown in FIG. 1.

Referring to FIG. 2, there is shown an electrical circuit diagram of a dilution cycle control system for the absorption refrigeration system 1 shown in FIG. 1. As shown in FIG. 2, the circuit comprises a relatively high voltage section 50 and a relatively low voltage section 51. Power is supplied to the circuit by electrical leads $L_1$ and $L_2$. For example, a nominal 230 volt alternating current (AC) signal may be supplied by electrical leads $L_1$ and $L_2$ to the high voltage section 50. A transformer 53 converts this relatively high voltage signal used by the high voltage section 50 to a relatively low level voltage signal for use by the low voltage section 51. For example, a 230 volt AC signal supplied by electrical leads $L_1$ and $L_2$ may be converted to a 24 volt AC signal by the transformer 53. For ease of explanation, only a single phase electrical circuit diagram is shown in FIG. 2. However, it should be noted that the electrical circuit may be multi-phase.

Also, as shown in FIG. 2, the relatively high voltage section 50 of the dilution cycle control system includes solution pump motor contacts SPM-1 for the solution pump 10, refrigerant pump motor contacts RPM-1 for the refrigerant pump 9, and fan motor unit contacts FM-1 for the fan units 8 and 28. The relatively low voltage section 51 includes an on/off switch 54, a machine control relay MC for operating first, second, and third machine control contacts MC-1, MC-2, and MC-3, respectively, a time delay relay TD for operating time delay relay contacts TD-1, and the refrigerant low level switch 17. Also, included as part of the relatively low voltage section 51, is a fan motor relay FM for operating the fan motor unit contacts FM-1, a solution pump motor relay SPM for operating the solution pump motor contacts SPM-1, a refrigerant pump motor relay RPM for operating the refrigerant pump motor contacts RPM-1, and a relay 47 for operating the dilution cycle control valve 48. The time delay relay TD may be a Potter and Brumfield, Inc., Model CGB-38-38050M time delay relay which provides a delay on release. The dilution cycle control valve 48 may be a solenoid operated valve which is opened and closed in response to activation and deactivation, respectively, of the relay 47.

In operation, when the absorption refrigeration system 1 is turned on by closing the on/off switch 54, the machine control relay MC is energized and operates to close machine control contacts MC-1 and MC-2, and to open machine control contacts MC-3, as shown in FIG. 2. This activates the fan motor unit relay FM, the solution pump motor relay SPM, and the refrigerant pump motor relay RPM to close the contacts FM-1, SPM-1, and RPM-1, respectively, as shown in FIG. 2, thereby turning on the fan units 8 and 28, the solution pump 10, and the refrigerant pump 9. Normally, the dilution cycle control valve 48 is closed when the absorption refrigeration system 1 is operating since the machine control contacts MC-3 are open thereby deactivating the relay 47 for the valve 48. Also, it should be noted that the refrigerant low level switch 17 in the evaporator 5 may be open, as shown in FIG. 2, at start up of the absorption refrigeration system 1 but, soon after start up, the refrigerant level in the sump 29 of the evaporator 5 will build up to close the switch 17. The time delay relay TD is also energized upon start up of the absorption refrigeration system 1 to open the time delay relay contacts TD-1, as shown in FIG. 2.

When the absorption refrigeration system 1 is turned off by opening the on/off switch 54, the machine control relay MC is de-energized to open the contacts MC-1 and MC-2, and to close the contacts MC-3. This deactivates the relays FM, SPM, and RPM, to open contacts SPM-1, RPM-1, and FM-1, thereby shutting down the absorption refrigeration system 1 by turning off the fan units 8 and 28, the solution pump 10, and the refrigerant pump 9. Also, the time delay relay TD begins its timing function when it is de-energized, due to the shutdown of the absorption refrigeration system 1. If the refrigeration system 1 is restarted before the time delay relay TD times out, the system 1 resumes normal operation and the time delay relay TD is reset. However, if the time delay relay TD times out and the absorption refrigeration system 1 has not been restarted, then a dilution cycle is initiated automatically.

When the time delay relay TD times out the time delay relay contacts TD-1 are closed thereby activating the solution pump motor relay SPM, the refrigerant pump motor relay RPM, and the relay 47 for the dilution cycle control valve 48. These components will be activated since the refrigerant low level switch 17 and the machine control contacts MC-3 will be closed when the refrigeration system 1 is shutdown after a period of normal operation. When activated, the solution pump motor relay SPM and the refrigerant pump motor relay RPM operate to close the solution pump motor contacts SPM-1 and the refrigerant pump motor contacts RPM-1 thereby turning on the solution pump 10 and the refrigerant 9, respectively. Also, the dilution cycle control valve 48 is opened when its relay 47 is activated. In this mode of operation, refrigerant is pumped from the sump 29 of the evaporator 5 through the dilution cycle control valve 48 to dilute the strong solution in the solution heat exchanger 7 and the generator 3 of the absorption refrigeration system 1.

After sufficient refrigerant has been transferred to the heat exchanger 7 and the generator 3 from the sump of the evaporator 5, the refrigerant low level switch 17 opens to deactivate the solution pump motor relay SPM, the refrigerant pump motor relay RPM, and the relay 47 for the dilution cycle control valve 48. Deactivating the relays SPM and RPM causes the contacts SPM-1 and RPM-1 to open thereby turning off the solution pump 10 and refrigerant pump 9, respectively. Deactivating the relay 47 for the dilution cycle control valve 48 causes the valve 48 to close. Thus, at the next start up of the absorption refrigeration system 1, the time delay relay TD will be reset and the system 1 will be returned to its normal operating state.

It should be noted that, although the present invention has been described in conjunction with a particular embodiment, various modifications to the present invention will be apparent to one of ordinary skill in the art to which this invention pertains. Therefore, while the present invention has been described in conjunction with a particular embodiment, it is to be understood that various modifications and other embodiments of the present invention may be made without departing from the scope of the invention as described herein and as claimed in the appending claims.

What is claimed is:

1. A dilution cycle control system for an absorption refrigeration system having a generator, an evaporator, an absorber, and a heat exchanger, with a solution pump for circulating weak absorbent solution from the absorber through the heat exchanger to the generator, and with a refrigerant pump for circulating liquid refrigerant from a sump in the evaporator through a dilution cycle control valve to the inlet of the solution pump to provide a dilution cycle when the refrigeration system is shut down, said control system comprising:
   sensor means for sensing shutdown of the absorption refrigeration system and for generating a control signal after expiration of a pre-selected time period measured from the sensed shutdown of the absorption refrigeration system, during which the absorption refrigeration system is not restarted;
   means for turning on the refrigerant pump and the solution pump, and for opening the dilution cycle control valve to provide a dilution cycle for the absorption refrigeration system in response to generation of the control signal by the sensor means; and
   switch means for sensing the amount of refrigerant in the evaporator, and for turning off the refrigerant pump and the solution pump, and for closing the dilution cycle control valve, to end the dilution cycle when a preselected low amount of refrigerant is sensed in the evaporator by said switch means.

2. A dilution cycle control system for an absorption refrigeration system as recited in claim 1 wherein the sensor means comprises:
   a time delay relay which monitors electrical power supplied to operate the absorption refrigeration system and which generates a control signal only after expiration of a pre-selected time period during which no electrical power is supplied to operate the absorption refrigeration system.

3. A dilution cycle control system for an absorption refrigeration system as recited in claim 1 wherein the means for turning on the refrigerant pump and the solution pump, and for opening the dilution cycle control valve comprises:
   contact means for supplying electrical power to operate the refrigerant pump and the solution pump when said contact means are closed;
   first relay means for closing the contact means when said relay means are activated;
   second relay means for supplying electrical power to open the dilution cycle control valve when said second relay means is activated; and
   means for activating the first and second relay means in response to generation of the control signal by the sensor means.

4. A dilution cycle control system for an absorption refrigeration system as recited in claim 1 wherein the switch means comprises:
   a refrigerant low level switch located in the sump of the evaporator for sensing the level of liquid refrigerant in the sump of the evaporator, and for turning off the refrigerant pump and the solution pump, and for closing the dilution cycle control valve, to end the dilution cycle when a preselected low level of liquid refrigerant is sensed in the sump of the evaporator.

5. An absorption refrigeration system comprising:
   a generator for generating refrigerant vapor and strong absorbent solution by heating weak absorbent solution;
   a condenser for receiving the the refrigerant vapor from the generator and for condensing the refrigerant vapor to a liquid;
   an evaporator for receiving the liquid refrigerant from the condenser and for evaporating the liquid refrigerant to cool a medium in heat exchange relationship with the refrigerant in the evaporator;
   a refrigerant pump for circulating liquid refrigerant from a sump in the evaporator back through the evaporator to provide a continuous flow of liquid refrigerant through the evaporator during normal operation of the absorption refrigeration system;
   an absorber for receiving the refrigerant vapor from the evaporator, for receiving the strong absorbent solution from the generator, and for bringing the refrigerant vapor and the strong absorbent solution into contact so that the refrigerant vapor is absorbed by the strong absorbent solution to produce weak absorbent solution;
   a solution pump for supplying the weak absorbent solution produced by the absorber to the generator;
   a heat exchanger located between the absorber and the generator for transferring heat between the weak absorbent solution, which is pumped from the absorber by the solution pump to the generator, and the strong absorbent solution flowing to the absorber from the generator;
   conduit means for connecting the outlet of the refrigerant pump to the inlet of the solution pump;
   valve means, located in the conduit means, for controlling the flow of liquid refrigerant from the outlet of the refrigerant pump to the inlet of the solution pump;

sensor means for sensing shutdown of the absorption refrigeration system and for generating a control signal after expiration of a preselected time period measured from the sensed shutdown of the absorption refrigeration system, during which the absorption refrigeration system is not restarted;

means for turning on the refrigerant pump and the solution pump, and for opening the valve means to provide a dilution cycle for the absorption refrigeration system in response to generation of the control signal by the sensor means; and switch means for sensing the amount of refrigerant in the evaporator, and for turning off the refrigerant pump and the solution pump, and for closing the valve means, to end the dilution cycle when a preselected low amount of refrigerant is sensed in the evaporator by said switch means.

6. An absorption refrigeration system as recited in claim 5 wherein the sensor means comprises:

a time delay relay which monitors electrical power supplied to operate the absorption refrigeration system and which generates a control signal only after expiration of a preselected time period during which no electrical power is supplied to operate the absorption refrigeration system.

7. An absorption refrigeration system as recited in claim 5 wherein the means for turning on the refrigerant pump and the solution pump, and for opening the valve means comprises:

contact means for supplying electrical power to operate the refrigerant pump and the solution pump when said contact means are closed;

first relay means for closing the contact means when said relay means are activated;

second relay means for supplying electrical power to open the valve means when said second relay means is activated; and means for activating the first and second relay means in response to generation of the control signal by the sensor means.

8. An absorption refrigeration system as recited in claim 5 wherein the switch means comprises;

a refrigerant low level switch located in the sump of the evaporator for sensing the level of liquid refrigerant in the sump of the evaporator and for turning off the refrigerant pump and the solution pump, and for closing the valve means, to end the dilution cycle when a preselected low level of liquid refrigerant is sensed in the sump of the evaporator.

9. A method of operating an absorption refrigeration system having a generator, an evaporator, an absorber, and a heat exchanger, with a solution pump for circulating weak absorbent solution from the absorber through the heat exchanger to the generator, and with a refrigerant pump for circulating liquid refrigerant from a sump in the evaporator through a dilution cycle control valve to the inlet of the solution pump to provide a dilution cycle when the refrigeration system is shut down, said method comprising the steps of:

sensing shutdown of the absorption refrigeration system;

generating a control signal after expiration of a preselected time period measured from the sensed shutdown of the absorption refrigeration system, during which the absorption refrigeration system is not restarted;

turning on the refrigerant pump and the solution pump, and opening the dilution cycle control valve to provide a dilution cycle for the absorption refrigeration system in response to generation of the control signal;

sensing the amount of refrigerant in the evaporator; and turning off the refrigerant pump and the solution pump, and closing the dilution cycle control valve, to end the dilution cycle when a preselected low amount of refrigerant is sensed in the evaporator.

* * * * *